_United States Patent Office_ 3,056,646
Patented Oct. 2, 1962

3,056,646
METHOD OF EFFECTING THE CATALYTIC CONTACT OF GASES CONTAINING OXYGEN AND METHANE
Johann G. E. Cohn, West Orange, Alfred J. Haley, Jr., Colonia, and Holger C. Andersen, Morristown, N.J., assignors, by mesne assignments, to Engelhard Industries, Inc., Newark, N.J., a corporation of Delaware
No Drawing. Filed July 14, 1959, Ser. No. 826,934
12 Claims. (Cl. 23—2)

This invention relates to a process for effecting combustion reactions of oxygen-containing gases and, more particularly, relates to specific fuel-catalyst combinations which afford low ignition or kindling temperatures of methane in admixture with oxygen-containing gases.

The oxidation of methane at concentration levels below that at which a steady flame is possible has considerable importance in commerce and industry, and at least three applications for such processes may be visualized: (1) the removal of oxygen from gas streams: (2) the removal of methane from gas streams; and (3) the generation of heat.

In accordance with the present invention, catalysts and process conditions are provided which achieve these desirable results in a practical, efficient and economical manner. The invention is, however, not limited to these specific objectives.

One of the most important functions of a catalyst is that it promotes the desired reactions at temperatures appreciably lower than those at which the non-catalytic reactions occur at a practical rate. In the case of methane oxidation, this is an especially important consideration, since experience has shown that, of all hydrocarbons, it is the most difficult to ignite. On the other hand, methane is also often the cheapest fuel available to an industrial user, being the principal constituent of natural gas. These two facts thus make it economically important to find means for "igniting" or initiating the methane-oxygen reaction at the lowest possible temperature.

In copending application Serial No. 650,863, filed April 5, 1957, and now abandoned, a process for effecting combustion reactions of oxygen-containing gases is disclosed, in which the fuels which may be employed are ethane, propane, ethylene, acetylene and benzene, these fuels being passed in admixture with an oxygen-containing gas over a palladium, platinum, rhodium or ruthenium catalyst at reaction temperature.

In the present invention, it has been found that supported platinum group metal catalysts as well as silver are especially effective for promoting the oxygen methane reaction. The most effective metals are palladium, platinum, ruthenium, rhodium and iridium and mixtures thereof. From the standpoint of low ignition temperature, the most active of these metals is rhodium, although palladium is almost as active; under certain conditions, 0.5 percent palladium metal supported on activated alumina pellets effects methane oxidation at an initial gas temperature of 282° C. The ignition temperature is, to some extent, a function of gas composition and other operating variables, as will be noted from the examples below.

A further important characteristic of catalysts is the completeness with which they effect the desired reaction. Using completeness as the criterion, the platinum group metals and silver are again the most effective. When the catalytic process of the invention is used to remove oxygen from gas streams by the oxidation of methane, purified streams result which contain only a few parts per million of oxygen, and methane concentration can be reduced to the part-per-million level in gas streams using a very slight excess of oxygen. Both types of catalytic process are illustrated in the examples below.

The catalysts which may be used in the process of the invention are palladium, platinum, ruthenium, rhodium, iridium or osmium, per se, or in admixture with each other, and/or supported on suitable carriers. The supported catalysts may contain from about 0.05 to 5 percent, by weight, of the catalytic metal, although 0.5 percent is a metal content which produces excellent results from the standpoint of both economy and activity. The catalyst may be supported on suitable supports such as activated alumina, silica, silica gel, diatomaceous earth and other similar catalyst supports, and the supported catalyst may be prepared in any suitable manner, e.g. by treating the carrier or support with a solution of a suitable metal compound and then reducing the metal compound to metal. The catalyst support may be in the form of granules, pellets, or powder.

The catalysts of the invention will ignite methane-oxygen mixtures at temperatures as low as 271° C., and are operable at temperatures in the range up to 900° C. and higher. In general, the higher the operating temperature, the shorter will be the catalyst life and the more difficult will be subsequent ignition after catalyst cooling.

The space velocity may be in the range of about 100 to 200,000 standard volumes of gas per volume of catalyst per hour, and a space velocity in the range of about 2,000 to 100,000 standard volumes per volume per hour is preferred. The reaction pressure may be in the range of atmospheric to about 500 p.s.i.g. or higher. Pressure limitations are imposed by the strength limits of catalyst vessels rather than by any fundamental properties of the catalysts themselves.

Essentially quantitative removal of either methane or oxygen from a wide variety of gases is possible. The deficient compound is removed with a slight excess of the other. The methane and oxygen may be in admixture with any of a large number of inert gases, such as nitrogen, argon, helium, neon, carbon dioxide and the like; the streams may be initially dry or saturated with water vapor.

An upper limit on the oxygen or methane removable in a single pass over the catalyst arises from the minimum and maximum temperatures at which a given catalyst can operate. Generally, this consideration will limit the oxygen removable per pass to about 4 percent, or the methane to 2 percent, by volume, in nitrogen, or to somewhat different values in diluent gases having specific heats different from that of nitrogen. However, engineering design can overcome this limitation by providing, for example, either for re-cycling of gas so as to maintain the inlet composition at the desired value, or by passing the full gas stream through two or more stages of catalyst, with intermediate cooling. By these means, the process of the invention can be utilized to treat gases having very high concentrations of methane and/or oxygen.

The invention will be further illustrated by reference to the following specific examples in which all gaseous percentages are by volume:

EXAMPLE I

A gas mixture of 1.5 percent methane, 3 percent oxygen, and 95.5 percent nitrogen was passed, at the rate of 10 cubic feet per hour, through a bed containing 2.5 grams of catalyst pellets, at atmospheric pressure. The temperature was gradually raised until the catalyst temperature showed a sudden increase due to combustion, and the temperature at which the sudden increase occurred was taken as the ignition point. In another series of experiments, conditions were the same, except that a gas containing 21 percent oxygen was employed. The results of the catalyst evaluations are as follows:

Table I

| Catalyst | Ignition Temp., °C., 3 percent $O_2$ | 21 percent $O_2$ |
| --- | --- | --- |
| 0.5% Pt on activated alumina | 530 | 630 |
| 0.5% Pd on activated alumina | 415 | 375 |
| 0.5% Ru on activated alumina | 510 | 540 |
| 0.5% Rh on activated alumina | 365 | 390 |
| 0.5% Ir on activated alumina | 500 | 600 |
| 0.5% Ag on activated alumina | 615 | |
| 0.25% Pd+0.25% Rh on activated alumina | 400 | |
| 0.3% Pt+0.2% Rh on activated alumina | 375 | |
| 0.4% Pt+0.1% Rh on activated alumina | 410 | |

Contrasted with these results, 0.5 percent nickel supported on alumina caused no ignition at temperatures up to 600° C.

From the data tabulated above, the following table of relative ignition efficiencies for methane combustion may be constructed.

| In Neutral Atmosphere | In oxidizing Atmosphere |
| --- | --- |
| Rh | Pd |
| Pd | Rh |
| Ir | Ru |
| Ru | Ir |
| Pt | Pt |

Economic as well as technical factors will affect the choice of catalyst in individual cases and, thus, palladium may often be chosen to operate in a neutral or reducing atmosphere, where rhodium shows a slight technical superiority.

The temperatures given above are correct only relatively. At the small scale of the experiment, heat losses are substantial, which has the effect of raising the observed ignition temperature considerably beyond the value characteristic of a large mass. Ignition temperatures more nearly representative of those attainable in systems of industrial size are given in the following examples:

EXAMPLE II

A 100-ml. charge of 0.5 percent palladium on ⅛" activated alumina pellets was placed in a 1.05" internal diameter stainless steel pipe. A mixture of 1.5 percent methane in air was passed through the bed at various flow rates and the "take-off" temperature was measured as in the previous example. In addition, the temperature rise in the catalyst bed, i.e. maximum bed temperature minus inlet gas temperature, was observed.

The results are as follows:

| Flow, C.f.h. | Take-Off Temp., °C. | Δ T, °C. |
| --- | --- | --- |
| 200 | 278 | 280 |
| 120 | 271 | 240 |

At both flow rates there was considerable heat loss, since the temperature rise should be about 400° C., based upon the heat of reaction and the specific heat of the effluent gas stream.

EXAMPLE III

A series of experiments was conducted to remove oxygen from a nitrogen stream by catalytic reaction of the oxygen with methane. A mixture containing 0.33 percent oxygen, by volume, in nitrogen, was mixed with methane and passed over 10 ml. of 0.5 percent palladium supported on activated alumina at atmospheric pressure. Good oxygen removal was obtained at flow rates in the range of 10,000 to 20,000 ml. of gas per hour per gram of catalyst, under laboratory conditions.

The results are as follows:

| Exp. No. | Cat. Temp., °C. | Space Vel., ml. per hr. per g. | Percent $O_2$ in | Percent $CH_4$ in | Outlet Gas, p.p.m. $O_2$ |
| --- | --- | --- | --- | --- | --- |
| 1 | 303 | 10,000 | 0.33 | 0.18 | 140 |
| 2 | 350 | 10,000 | 0.33 | 0.18 | 30 |
| 3 | 407 | 10,000 | 0.33 | 0.18 | 8 |
| 4 | 366 | 20,000 | 0.33 | 0.18 | 110 |
| 5 | 459 | 20,000 | 0.33 | 0.18 | 4 |
| 6 | 459 | 20,000 | 0.33 | 0.28 | 4 |

When the methane excess was small, as in experiments 1–5, only small quantities of carbon monoxide, less than 50 parts per million, were found. In experiment 6, methane excess was sufficient to produce more than 400 parts per million of carbon monoxide.

EXAMPLE IV

A series of experiments was conducted similar to the experiments of Example III above. However, the stream to be purified consisted of 0.30 percent oxygen, 11.4 percent carbon dioxide, 2.3–2.5 percent water vapor and the balance was nitrogen. Five grams of 0.5 percent palladium on activated alumina catalyst were used and the stream passed through the bed at flow rates of 100 to 300 liters per hour. Good oxygen removal was found at space velocities as high as 60,000.

The results are as follows:

| Exp. No. | Cat. Temp., °C. | Space Vel., ml. per hr. per g. | Percent $CH_4$ | p.p.m. $O_2$ in Outlet Gas |
| --- | --- | --- | --- | --- |
| 1 | 432 | 20,000 | 0.20 | 3 |
| 2 | 556 | 60,000 | 0.20 | 11 |
| 3 | 535 | 60,000 | 0.22 | 6 |
| 4 | 491 | 60,000 | 0.22 | 30 |

The carbon monoxide concentration in the effluent was between 100 and 200 parts per million in experiment 1, and about 200 parts per million in experiment 2.

EXAMPLE V

An experiment was conducted in order to remove methane from an inert gas stream by reaction with oxygen, the carbon dioxide and water formed being readily removable by conventional means. The catalyst was 0.5 percent palladium on activated alumina pellets, and the gas stream was argon to which carefully measured quantities of methane, carbon monoxide and oxygen had been added. The catalyst charge, five grams, was placed in an 0.82" internal diameter stainless steel reactor, which was operated at a gas pressure of 35 p.s.i.g. The gas was passed through the catalyst bed, which was heated to the desired temperatures, and the catalyst effluent was analyzed for total combustible carbon (the sum of carbon monoxide and methane) at various conditions. The results are tabulated below for an inlet gas containing 50 parts per million carbon monoxide, 50 parts per million of methane, and 1000 parts per million of oxygen.

The results are as follows:

| Temp., °C. | Space Vel., ml. gas per ml. cat. per hr. (NTP) | Parts per million (CO+$CH_4$) in Effluent Gas |
| --- | --- | --- |
| 420 | 10,000 | 6 |
| 435 | 10,000 | 4 |
| 512 | 10,000 | 3 |

The analytical method for combustible carbon was accurate to approximately plus or minus three parts per million, so that the actual removal of methane was very complete under the conditions employed.

EXAMPLE VI

An experiment like that of Example V was conducted, except that the carbon monoxide and methane were each increased to 200 parts per million, while oxygen concentration was maintained at 1000 parts per million. Good methane removal was again found at various combinations of temperature and space velocity, as follows:

| T., ° C. | S.V. | (CO+CH₄) Out |
|---|---|---|
| 480 | 10,000 | (−1) |
| 404 | 3,300 | 0 |
| 446 | 6,000 | 2 |

It will be obvious to those skilled in the art that many modifications may be made within the scope of the present invention without departing from the spirit thereof, and the invention includes all such modifications.

What is claimed is:

1. A process for effecting the ignition and combustion of a gaseous mixture consisting essentially of oxygen, methane and inert gases, which comprises adding a fuel consisting essentially of methane to a gaseous mixture consisting essentially of oxygen and inert gases, and contacting the resulting gaseous admixture at a temperature above the ignition temperature of said admixture but not in excess of 400° C. with a catalyst selected from the group consisting of rhodium and rhodium in admixture with another platinum group metal, thereby igniting the gaseous admixture and effecting the combustion thereof.

2. A process according to claim 1 wherein the fuel is methane.

3. A process according to claim 1 wherein the fuel is a natural gas.

4. A process according to claim 1 wherein the catalyst is rhodium.

5. A process for effecting the ignition and combustion of a gaseous mixture consisting essentially of oxygen, methane and inert gases, which comprises adding a fuel consisting essentially of methane to a gaseous mixture consisting essentially of oxygen and inert gases, and contacting the resulting gaseous admixture with a catalyst selected from the group consisting of rhodium and rhodium in admixture with another platinum group metal, thereby igniting the gaseous admixture at a temperature in the range of from 271° C. to 400° C.

6. A process according to claim 5 wherein the catalyst is rhodium supported on a carrier.

7. A process according to claim 5 wherein the catalyst is rhodium in admixture with platinum.

8. A process according to claim 5 wherein the catalyst is rhodium in admixture with palladium.

9. A process according to claim 5 wherein the catalyst is supported and the catalytic metal content of the catalyst is in the range of about 0.05 to 5.0 percent of the total catalyst.

10. A process according to claim 6 wherein the carrier is activated alumina.

11. A process according to claim 5 wherein the catalytic metal is in finely divided form.

12. A process according to claim 5 wherein the space velocity is in the range of about 100 to 200,000 s.c.f.h./c.f.

References Cited in the file of this patent

UNITED STATES PATENTS

| 1,934,838 | Andrussow | Nov. 14, 1933 |
| 1,960,212 | Walker | May 22, 1934 |
| 2,776,317 | Reeder | Jan. 1, 1957 |

OTHER REFERENCES

Mellor: "A Comprehensive Treatise on Inorganic and Theoretical Chemistry," Longmans, Green and Co., N.Y., vol. 15, 1936, page 631.